US008152689B2

(12) United States Patent
Borntrager

(10) Patent No.: US 8,152,689 B2
(45) Date of Patent: Apr. 10, 2012

(54) DRIVE TRAIN AS WELL AS A METHOD OF OPERATING A HYDRAULIC PUMP OF A DRIVE TRAIN

(75) Inventor: Kai Borntrager, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 869 days.

(21) Appl. No.: 12/192,319

(22) Filed: Aug. 15, 2008

(65) Prior Publication Data

US 2009/0048065 A1 Feb. 19, 2009

(30) Foreign Application Priority Data

Aug. 18, 2007 (DE) .......................... 10 2007 039 083

(51) Int. Cl.
*F16H 61/48* (2006.01)
*F16H 61/40* (2010.01)
(52) U.S. Cl. ........................................... 477/61; 477/69
(58) Field of Classification Search ..................... 477/53, 477/61, 68, 69
See application file for complete search history.

(56) References Cited

U.S. PATENT DOCUMENTS

| 3,080,773 | A  | * | 3/1963 | Lee et al. | .................... | 74/731.1 |
| 4,016,778 | A  | * | 4/1977 | Von Greyerz | .................. | 475/32 |
| 7,316,631 | B2 | * | 1/2008 | Tsunekawa | ..................... | 477/62 |
| 2003/0035742 | A1 | | 2/2003 | Vukovich et al. | | |

FOREIGN PATENT DOCUMENTS

| DE | 11 98 609 | 8/1965 |
| DE | 38 21 367 | 6/1989 |
| DE | 38 12 412 | 10/1989 |
| DE | 38 12 412 A1 | 10/1989 |
| EP | 12 84 214 | 2/2003 |

* cited by examiner

*Primary Examiner* — Tisha Lewis
(74) *Attorney, Agent, or Firm* — Davis & Bujold, PLLC

(57) ABSTRACT

A method of operating a hydraulic pump of a drive train of a motor vehicle having a transmission with a hydrodynamic torque converter and a engine, with the input speed of the hydraulic pump being adjusted depending on the speed of the engine. The input speed of the hydraulic pump is adjusted depending on the pump speed of the torque converter, which corresponds to the speed of the engine and depends on the turbine speed of the torque converter, such that when the pump speed of the torque converter is higher than the turbine speed of the same, the hydraulic pump is operated at a speed higher than the speed of the engine. When the turbine speed of the torque converter and the pump speed of the same equalize, the excessive increase in the input speed of the hydraulic pump is reduced in relation to the speed of the engine.

7 Claims, 1 Drawing Sheet

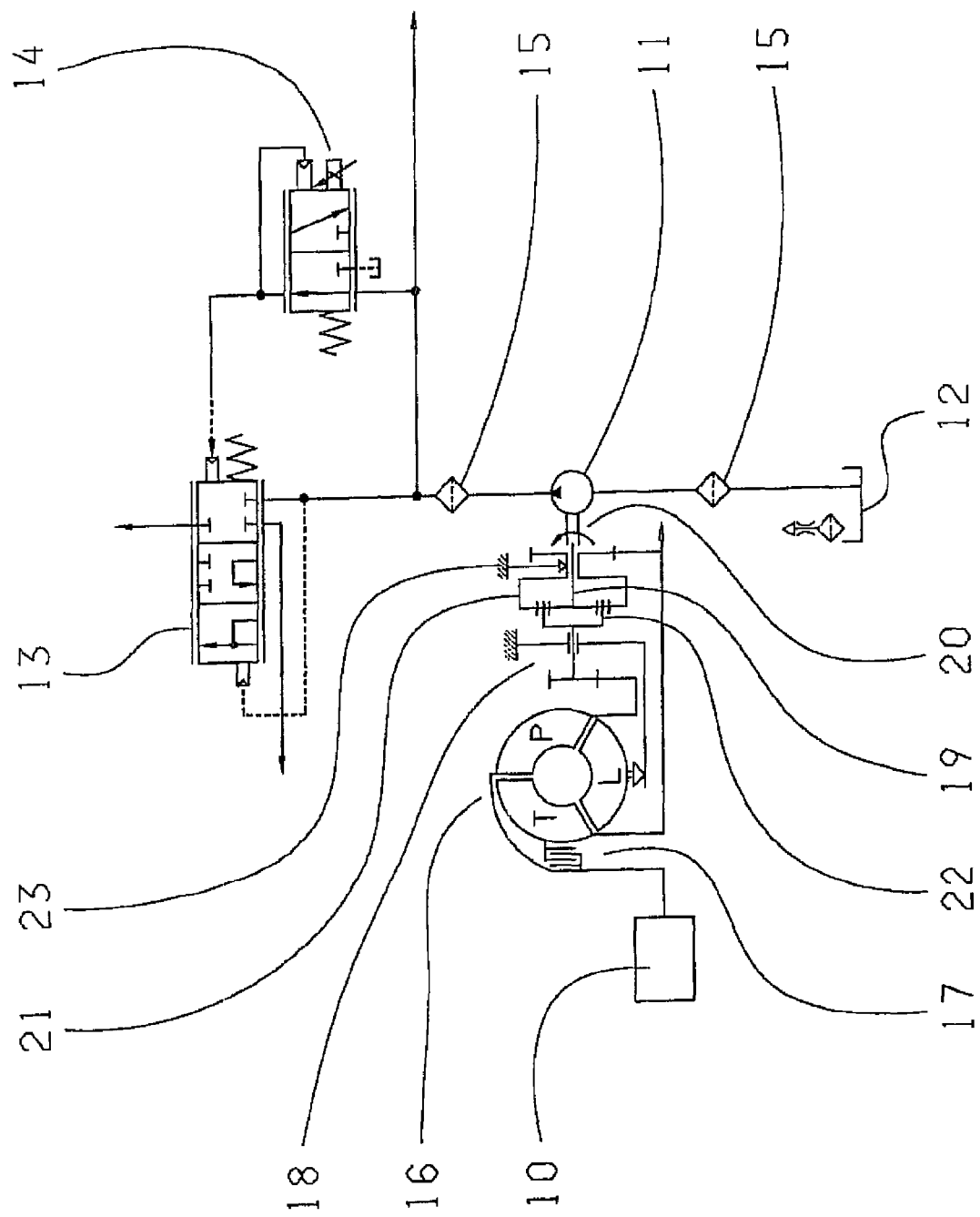

DRIVE TRAIN AS WELL AS A METHOD OF OPERATING A HYDRAULIC PUMP OF A DRIVE TRAIN

This application claims priority from German Application Serial No. 10 2007 039 083.3 filed Aug. 18, 2007.

FIELD OF THE INVENTION

The invention relates to a method of operating a hydraulic pump of a drive train of a motor vehicle having a transmission and a drive engine. Moreover, the invention relates to a drive train.

BACKGROUND OF THE INVENTION

The main components of a drive train of a motor vehicle are a drive engine and a transmission. The transmission converts the tractive force provided by the drive engine. The components of the drive unit may be controlled via an oil volume flow provided by a hydraulic pump of the drive train. The oil volume flow, provided by the hydraulic pump, is further used for cooling the components of the drive engine.

For cost reasons, a fixed displacement pump is typically used in the drive engine of a motor vehicle for providing the oil volume flow, which is used to control and cool the components of the drive engine. In these cases, the input speed of the fixed displacement pump is adjusted, depending on the speed of the drive engine of the drive train, so that the oil volume flow, provided by the hydraulic pump, is dependent upon the speed of the drive engine. In order to avoid inadmissible heating in transmissions, for example in automatic transmissions, which comprise a hydrodynamic torque converter, a hydraulic pump has to provide a high oil volume flow even when the drive engine is running at low speed. Consequently, when the drive engine is operating at high speed, the hydraulic oil volume flow, provided by the hydraulic pump, is too big. The excess oil volume flow is released by pressure limiting valves, whereby hydraulic energy is converted into heat and consequently lost.

A drive for a fixed displacement pump of the drive train of a motor vehicle is known from DE 38 12 412 A1. The drive comprises a planetary gear, namely a planetary gear with an input path and two output paths, the output paths acting upon one another with respect to their speeds. Different assemblies may be driven via both output paths.

With this in mind, it is the object of the present invention to develop an innovative method for operating the hydraulic pump of the drive train of a motor vehicle having a transmission and a drive engine, as well as an innovative drive train.

SUMMARY OF THE INVENTION

This object is attained, such that the input speed of the hydraulic pump is adjusted, depending on the pump speed of the torque converter, which corresponds to the speed of the drive engine and, depending on the turbine speed of the torque converter such that, when the pump speed of the torque converter is higher than the turbine speed of same, the hydraulic pump is driven at a speed that is higher than the speed of the drive engine and that, when the turbine speed of the torque converter and the pump speed of the same approach one another, the excessive increase in the input speed of the hydraulic pump is reduced in relation to the speed of the drive engine.

Consistent with the method according to the invention, the input speed of the hydraulic pump, which provides the oil volume flow for controlling and cooling the components of the drive engine, is determined as a function of the speed of the turbine of a torque converter as well as the pump speed of the latter.

Hence the invention is based on the idea of using the speed difference between the pump speed of the torque converter and of the turbine speed of same in order to control the input speed of the hydraulic pump as needed. The input speed of the hydraulic pump is determined or adjusted such that when the pump speed of the torque converter is higher than the turbine speed of same, the hydraulic pump is driven at a speed that is higher than the speed of the drive engine.

In contrast, when the turbine speed of the torque converter and pump speed of same approach one another, the excessive increase of the input speed of the hydraulic pump is reduced in relation to the speed of the drive engine. Thus, the oil volume flow provided by the hydraulic pump is adjusted to the cooling requirements of the hydrodynamic torque converter. Owing to the fact that the fixed displacement pump is operated at an excessively increased speed in relation to the speed of the drive engine when the speed difference between the pump speed of the torque converter and the turbine speed of same is great, the hydraulic pump may be designed to be smaller so that fuel may ultimately be conserved.

BRIEF DESCRIPTION OF THE DRAWING

The invention will now be described, by way of example, with reference to the accompanying drawings in which:

FIG. 1 is a section of a motor vehicle drive train according to the invention.

DETAILED DESCRIPTION OF THE INVENTION

FIG. 1 shows a schematic section of a motor vehicle drive train in the area of a drive engine 10 and a hydraulic pump 11. The hydraulic pump 11 is used for providing an oil volume flow for controlling and cooling components of the drive train.

The hydraulic pump 11 is preferably a fixed displacement pump, which may be operated at an input speed and, depending on the input speed, extracts oil from a supply tank 12 and provides the components of the drive engine 10 with an oil volume flow.

Components that are provided with the oil volume flow by the hydraulic pump 11, FIG. 1 includes two valves, namely a system pressure valve 13 and a pilot valve 14 for the system pressure valve 13. An oil filter 15 is located, between the hydraulic pump 11 and the supply tank 12, as well as between the hydraulic pump 11 and the valves 13, 14.

Apart from the drive engine 10 and the hydraulic pump 11, the drive train of the motor vehicle further comprises a transmission, in particular an automatic transmission with a hydrodynamic torque converter 16, where only the hydrodynamic torque converter 16 of the transmission, as well as a converter clutch 17, which is inserted between the hydrodynamic torque converter 16 and the transmission drive engine 10, are shown. A turbine T, a pump P and an idler L of the hydrodynamic torque converter 16 are schematically shown.

The present invention now relates to a method of operating a hydraulic pump 11, namely for the determination and/or adjustment of a defined input speed for the hydraulic pump 11.

Consistent with the present invention, the input speed of the hydraulic pump 11 is determined as a function of the speed of the pump P of the torque converter, as well as a function of the speed of the turbine T of the torque converter.

The speed of the pump P of the torque converter corresponds to the speed of the drive engine 10.

The input speed of the hydraulic pump 11 is adjusted, depending on the pump speed and the turbine speed of the torque converter 16 such that, when the pump speed of the torque converter is higher than the turbine speed of same, the hydraulic pump 11 is operated at an input speed that is higher than the speed of the drive engine 10 and consequently is excessively increased in relation to the speed of the drive engine. When the turbine speed of the torque converter 16 approaches the pump speed of same, the excessive increase in the input speed of the hydraulic pump 11 is reduced in relation to the speed of the drive engine 10.

Specifically, when the motor vehicle is stationary with the drive engine running, and consequently the pump speed of the torque converter 16 corresponds to the speed of the drive engine 10, and the turbine speed of the torque converter 16 is equal to zero, the hydraulic pump is operated at an input speed that is maximally increased in relation to the drive engine 10. When the turbine speed of the torque converter 16 approaches the pump speed of the same in the traction mode of operation, the excessively increased speed of the hydraulic pump 11 is reduced in relation to the speed of the drive engine 10. When the pump speed of the torque converter 16 corresponds to the turbine speed of the torque converter 16 in the traction mode of operation, the hydraulic pump 11 is operated at a speed that corresponds to the speed of the drive engine 10.

In contrast, when the turbine speed of the torque converter 16 is higher than the pump speed of the same in the coast mode of operation, the hydraulic pump 11 is operated at an input speed that is lower than the speed of the drive engine 10.

As already explained, the input speed for the hydraulic pump 11, configured as a fixed displacement pump, is thus obtained on the basis of the speed of pump P of the torque converter 16, as well as on the basis of the speed of the turbine T of the torque converter 16, the pump speed of the torque converter 16 and the turbine speed of the torque converter 16 being superimposed in a planetary gearset 18 in the exemplary embodiment of FIG. 1.

The planetary gearset 18 has two input paths and one output path, the pump speed of the torque converter 16, acting on the first input path, and the turbine speed of the torque converter 16, acting on the second input path. The input speed of the hydraulic pump 11 acts on the output path of the planetary gearset 18.

In the exemplary embodiment shown in FIG. 1, the planetary gearset 18 is an elementary planetary gear in which a sun gear 19 of the planetary gearset 18 is coupled to an input shaft 20 of the hydraulic pump 11. A ring gear 21 of the planetary gearset 18 is coupled to the turbine T of the torque converter 16. A carrier gear 22 of the planetary gearset 18 is coupled to the pump P of the torque converter 16. The planetary gearset 18 further comprises a free-wheel 23. The ring gear 21 is thus coupled to a transmission input, via the turbine T of the torque converter 16, and the carrier gear 22 is coupled to a crankshaft of the drive engine 10 via the pump P of the torque converter 16.

The planetary gearset 18 of FIG. 1 is a minus gearset, which means that the ring gear 21 rotates in the opposite direction of the sun gear 19 when the carrier gear 22 is fixed and the sun gear 19 is rotating. The free-wheel 23, which acts on the ring gear 21 of the planetary gearset 18, must prevent the ring gear 21 from rotating backward when the drag torque, which in the transmission is switched to "neutral", is not sufficient to provide a reaction torque for the ring gear 21. This is important for the excessive increase in input speed of the hydraulic pump 11.

The input speed of the hydraulic pump 11 may be determined and/or provided by way of the planetary gearset 18 shown in FIG. 1.

If the motor vehicle is stationary while the engine is running, for example the speed $n_t$ of the turbine T of the torque converter 16 is equal to zero and the speed $n_P$ of the pump P of the torque converter 16 corresponds to the speed $n_{mot}$ of the drive engine 10. In this case, the input speed of the hydraulic pump 11 is maximally increased in relation to the speed $n_{mot}$ of the drive engine, the maximum increase depending on a stationary gear ratio of the planetary gearset 18.

It follows that:

$$i_P = \frac{1}{1 - i_{013}}, \quad \text{with } i_{013} = -\frac{Z_H}{Z_S}$$

where $i_P$ is the pump gear ratio, $i_{013}$ is the stationary gear ratio of the planetary gearset, $z_H$ is the number of teeth of the ring gear, and $z_s$ is the number of teeth of the sun gear of the planetary gearset.

If the number of teeth of the ring gear $z_H=120$ and the number of teeth of the sun gear $z_s=60$, then $i_P=0.333$, so that when the motor vehicle is stationary and the drive engine 10 is running, the hydraulic pump 11 is operated at triple the speed of the drive engine 10. Such an excessive speed increase may be used to reduce the configuration of the hydraulic pump 11, whose design depends on the requirements of a stationary vehicle.

When the motor vehicle is operated in the traction mode, during which the turbine speed of the torque converter 16 approaches the pump speed of same, the following equation applies to the planetary gearset 18:

$$n_P = i_{013}(n_T - n_{mot}) + n_{mot}$$

where $n_P$ is the pump speed of the torque converter, $n_T$ is the turbine speed of the torque converter, $i_{013}$ is the stationary gear ratio of the planetary gearset, and $n_{mot}$ is the drive engine speed.

With increasing speed $n_T$ of the turbine T of the torque converter 16, the excessive increase in the input speed of the hydraulic pump 11 is reduced in relation to the drive engine speed $n_{mot}$.

When the pump speed of the torque converter 16 matches the turbine speed of the torque converter 16, the speed of the hydraulic pump 11 corresponds to the speed of the drive engine 10.

When the motor vehicle is operated in the coast mode, the speed $n_T$ of the turbine of the torque converter 16 is higher than the speed $n_P$ of the torque converter 16, and the following equation is then applicable, analogously to the traction mode:

$$n_P = i_{013}(n_T - n_{mot}) + n_{mot}$$

In the coast mode of operation, the difference $n_T - n_{mot}$ is positive, reduced as a product with the stationary gear ratio $i_{013}$, and hereby reduces the pump speed in relation to the drive engine speed.

According to the present invention, it is recommended that the input speed of a hydraulic pump be obtained as a function of the pump speed of the torque converter and of the turbine speed of the torque converter. In this process, an unequal speed between both of them is utilized to cause an excessive increase in the speed of the hydraulic pump in relation to the speed of the drive engine. As a result of this, the hydraulic pump may be made smaller.

REFERENCE NUMERALS 10 drive engine
11 hydraulic pump
12 supply tank
13 valve
14 valve
15 oil filter
16 torque converter
17 converter clutch
18 planetary gearset
19 sun gear
20 input shaft
21 ring gear
22 carrier gear
23 free-wheel

The invention claimed is:

1. A method of operating a hydraulic pump (11) of a drive train of a motor vehicle having a transmission with a hydrodynamic torque converter (16) and a drive engine (10), the method comprising the steps of:

coupling the hydraulic pump (11) with the torque converter (16), which is coupled to the drive engine (10), such that an input speed of the hydraulic pump (11) is adjusted in dependence on a speed of a turbine (T) of the torque converter (16) and a speed of the torque converter (16), which corresponds to a speed of the drive engine (10);

operating the hydraulic pump (11) at a speed higher than the speed of the drive engine (10) when a speed of a pump (P) of the torque converter (16) is higher than the speed of the turbine (T) of the torque converter (16);

reducing the operating speed of the hydraulic pump (11) in relation to the speed of the drive engine (10) when the speed of the turbine (T) of the torque converter (16) approaches the speed of the pump (P) of the torque converter (16);

operating the hydraulic pump (11) at a maximally increased speed in relation to the speed of the drive engine (10) when the motor vehicle is stationary and the drive engine (10) is running and thus the speed of the pump (P) of the torque converter (16) corresponds to the speed of the drive engine (10) and the speed of the turbine (T) of the torque converter (16) is approximately zero; and operating the hydraulic pump (11) at a speed that corresponds to the speed of the drive engine (10) when the motor vehicle is in a drive operation and the speed of the pump (P) of the torque converter (16) corresponds to the speed of the turbine (T) of the torque converter (16).

2. The method according to claim 1, further comprising the step of reducing the operating speed of the hydraulic pump (11) in relation to the speed of the drive engine (10) when the motor vehicle is in a drive operation and the speed of the turbine (T) of the torque converter (16) approaches the speed of the pump (P) of the torque converter (16).

3. A method of operating a hydraulic pump (11) of a drive train of a motor vehicle having a transmission with a hydrodynamic torque converter (16) and a drive engine (10), the method comprising the steps of:

coupling the hydraulic pump (11) with the torque converter (16), which is coupled to the drive engine (10), such that an input speed of the hydraulic pump (11) is adjusted depending upon a speed of a turbine (T) of the torque converter (16) and a speed of the torque converter (16), which corresponds to a speed of the drive engine (10);

operating the hydraulic pump (11) at a speed higher than the speed of the drive engine (10) when a speed of a pump (P) of the torque converter (16) is higher than the speed of the turbine (T) of the torque converter (16);

reducing the operating speed of the hydraulic pump (11) in relation to the speed of the drive engine (10) when the speed of the turbine (T) of the torque converter (16) approaches the speed of the pump (P) of the torque converter (16);

operating the hydraulic pump (11) at a maximally increased speed in relation to the speed of the drive engine (10) when the motor vehicle is stationary and the drive engine (10) is running and thus the speed of the pump (P) of the torque converter (16) corresponds to the speed of the drive engine (10) and the speed of the turbine (T) of the torque converter (16) is approximately zero; and operating the hydraulic pump (11) at a speed lower than the speed of the drive engine (10) when the motor vehicle is in a coasting operation and the speed of the turbine (T) of the torque converter (16) is higher than the speed of the pump (P) of the torque converter (16).

4. A drive train of a motor vehicle comprising a drive engine (10), a transmission with a hydrodynamic torque converter (16) and a hydraulic pump (11) for providing an oil volume flow to hydraulically control and cool at least one component of the drive train, a device which adjusts an input speed of the hydraulic pump (11) depending on a speed of a turbine (T) of the torque converter (16) and a speed of a pump (P) of the torque converter (16), which corresponds to a speed of the drive engine (10);

the device is a planetary gearset (18), which superimposes the speed of the pump (P) of the torque converter (16) and the speed of the turbine (T) of the torque converter (16) to determine the input speed of the hydraulic pump (11); and a sun gear (19) of the planetary gearset (18) is coupled to an input shaft (20) of the hydraulic pump (11), a ring gear (21) of the planetary gear (18) is coupled to the turbine (T) of the torque converter (16), and a carrier gear (22) of the planetary gear (18) is coupled to the pump (P) of the torque converter (16), such that the ring gear (21) rotates in a direction opposite a direction of rotation of the sun gear (19) while the carrier gear (22) is stationary.

5. The drive train according to claim 4, wherein the device adjusts the input speed of the hydraulic pump (11) such that, the input speed of the hydraulic pump (11) is higher than the speed of the drive engine (10) when the speed of a pump (P) of the torque converter (16) is higher than the speed of the turbine (T) of the torque converter (16); and the input speed of the hydraulic pump (11) is reduced in relation to the speed of the drive engine (10) when the speed of the turbine (T) of the torque converter (16) approaches the speed of the pump (P) of the torque converter (16).

6. The drive train according to claim 4, wherein the ring gear (21) is coupled to a transmission input via the turbine (T) of the torque converter (16), and the carrier gear (22) is coupled to a crankshaft of the drive engine (10) via the pump (P) of the torque converter (16).

7. A drive train of a motor vehicle comprising:

a transmission comprising a planetary gearset (18) and a hydrodynamic torque converter (16) having a turbine (T) and a converter pump (P), the planetary gearset (18) comprises a sun gear (19), a carrier gear (22), which is coupled to the converter pump (P), and a ring gear (21), which is coupled to the turbine (T);

a drive engine (10) is coupled to the converter pump (P) and is couplable with the turbine (T); and a hydraulic pump (11), which provides a flow of oil to hydraulically control and cool at least one component of the drive train, the hydraulic pump (11) has an input shaft (20) that is coupled to and driven by the sun gear (19) of the planetary gearset (18);

the drive engine (10) communicates with the transmission, which communicates with the hydraulic pump (11), in such a manner that when the converter pump (P) has a rotational speed greater than a rotational speed of the turbine (T), the input shaft (20) of the hydraulic pump (11) has a rotational speed greater than a drive speed of the drive engine (10), and when the rotational speed of the turbine (T) is substantially equal to the rotational speed of the converter pump (P), the rotational speed of the input shaft (20) of the hydraulic pump (11) is reduced to substantially the drive speed of the drive engine (10).

* * * * *